United States Patent [19]
Anderson et al.

[11] Patent Number: 5,340,354
[45] Date of Patent: Aug. 23, 1994

[54] MEAT TENDERIZING APPARATUS AND PROCESS FOR TENDERIZING MEAT

[75] Inventors: Thomas Anderson, 1108 Trenton Ave., Point Pleasant, N.J. 08742; Julius Hanewald, 4612 SE. Cottonwood Ter., Stewart, Fla. 34997

[73] Assignees: Thomas Anderson, Point Pleasant, N.J.; Julius Hanewald, Stewart, Fla.; Avery B. Juhring, West Newbury, Vt.

[21] Appl. No.: 21,553

[22] Filed: Feb. 24, 1993

[51] Int. Cl.⁵ .............................................. A22C 9/00
[52] U.S. Cl. ........................................................ 452/142
[58] Field of Search ................ 452/142, 141; 425/513; 426/58

[56] References Cited

U.S. PATENT DOCUMENTS

| | | | |
|---|---|---|---|
| 116,166 | 6/1871 | Dennison | 452/142 |
| 446,485 | 2/1891 | Tyson | 452/142 |
| 717,077 | 12/1902 | Childers | 452/142 |
| 1,121,475 | 12/1914 | Carter | 452/142 |
| 1,149,336 | 8/1915 | Burris | 452/142 |
| 1,212,999 | 1/1917 | Peeler | 451/142 |
| 1,371,065 | 3/1921 | Beckers | 452/142 |
| 1,452,098 | 4/1923 | Short | 452/142 |
| 1,533,882 | 4/1925 | Mickey | 452/142 |
| 1,639,854 | 8/1927 | McBride | 452/142 |
| 1,889,192 | 11/1932 | Bruce | 452/142 |
| 1,991,439 | 2/1935 | Wood | 452/142 |
| 2,251,801 | 8/1941 | Plitt, Sr. et al. | 452/142 |
| 2,398,636 | 4/1946 | Henney et al. | 112/260 |
| 2,808,612 | 10/1957 | Snow | 452/12 |
| 3,230,578 | 1/1966 | Marvin et al. | 452/14 |
| 3,460,192 | 8/1969 | Marvin et al. | 452/14 |
| 3,556,806 | 1/1971 | Jungk et al. | 359/425 |
| 3,646,638 | 3/1992 | Snow | 17/53 |
| 3,659,315 | 5/1972 | Finley et al. | 146/222 |
| 3,704,484 | 12/1972 | Lapeyre et al. | 452/8 |
| 3,964,131 | 6/1976 | Snow | 17/53 |
| 4,085,482 | 4/1978 | Charron | 452/142 |
| 4,192,899 | 3/1980 | Roth | 425/513 |
| 4,199,841 | 4/1980 | Jaccard | 452/142 |
| 4,210,677 | 7/1980 | Huffman | 426/272 |
| 4,279,934 | 7/1981 | Hutchison et al. | 426/262 |
| 4,313,963 | 2/1982 | Greenspan | 426/58 |
| 4,349,575 | 9/1982 | Roth | 426/513 |
| 4,463,476 | 8/1984 | Jaccard | 452/142 |
| 4,715,091 | 12/1987 | Rome | 17/48 |
| 4,832,972 | 5/1989 | Toledo-Flores et al. | 426/327 |
| 4,898,741 | 2/1990 | Heide | 426/231 |

Primary Examiner—Willis Little

[57] ABSTRACT

A meat tenderizing apparatus and process for tenderizing meat, including opposed rollers having pyramidal points arranged in a grid on each roller. The rollers are maintained a set distance apart and partially frozen meat steaks are passed through the rollers and tenderized after only a single pass. The apparatus and process are particularly suited for tenderizing surf clam tongues.

30 Claims, 6 Drawing Sheets

MEAT TENDERIZING APPARATUS AND PROCESS FOR TENDERIZING MEAT

BACKGROUND OF THE INVENTION

The present invention relates to a meat tenderizing apparatus and process for tenderizing meat. More particularly, the present invention relates to a tenderizing apparatus and process for tenderizing surf clam tongues.

The surf clam is a member of the clam family which has been used in the seafood industry primarily for its meaty tongue or foot portion. Surf clam tongues are commercially significant because of their massive size compared to the more common and popular so-called "little-neck" clams. Because the surf clam tongue can range in size anywhere from 3 to 9 inches, and because surf clams proliferate throughout the eastern seaboard of the United States and other parts of the world, the seafood industry has long desired to make use of the surf clam in preparation of food products.

However, surf clam tongues are rubbery, tough and chewy, and thus are almost exclusively harvested and chopped into fine pieces for use in soups (e.g., New England Clam Chowder). Although the seafood industry has diced surf clam tongues into very thin strips (so-called "clam strips"), even these strips resemble the chewy and rubbery clam contents found in clam chowder, and thus are not as delectable as the more popular "little-neck" clams. The seafood industry has never been able to provide an apparatus and/or process which would render the entire surf clam tongue as a whole appealing to the average consumer. Although the entire surf clam tongue is edible, it has heretofore been impossible to market the clam tongue as a whole due to its severe rubbery and chewy nature.

Several methods have been proposed for preparing clams for consumption in U.S. Pat. Nos. 2,808,612; 3,230,578; 3,460,192; 3,646,638; 3,659,315; 3,964,131; 4,279,934; and 4,715,091. Several apparatuses have also been proposed for tenderizing meats in general, such as in U.S. Pat. Nos. 116,166; 446,485; 1,149,336; 1,371,065; 1,452,098; 1,533,882; and 1,639,854. However, none of these methods or apparatuses is effective in tenderizing surf clam tongues to such an extent that the whole tongue can be served as a steak and can be essentially cut with a fork (i.e., an acceptably tender surf clam tongue steak).

SUMMARY OF THE INVENTION

It is therefore an object of the present invention to provide a tenderizing apparatus and process for tenderizing meat, particularly surf clam tongues, which can be served as a whole in the form of an acceptably tender clam steak.

A first object of the present invention is to provide a meat tenderizing apparatus, comprising:

a pair of opposed longitudinal, rotatable rollers having parallel axes of rotation, said axes being fixed to maintain a spacing between said rollers, said spacing being minimum within a plane extending through said axes of rotation;

each roller comprising a plurality of pyramidal points each extending radially outwardly a distance "h" from the entire outer surface of the roller, said pyramidal points being arranged in a grid defined by a plurality of adjacent substantially annular rows and a plurality of adjacent substantially axial rows;

said rollers being axially and rotationally offset such that during rotation, at least within said plane extending through said axes of rotation, (i) each annular row of pyramidal points on one roller extends between two adjacent annular rows of pyramidal points on the other, opposed roller, (ii) each axial row of pyramidal points on said one roller extends between two adjacent axial rows of pyramidal points on said other, opposed roller, and (iii) when measured within said plane extending through said axes of rotation, vertexes of pyramidal points arranged in one axial row on said one roller are spaced about "⅜ h" from a lowermost point of a valley formed between two adjacent axial rows on said other, opposed roller; and means for providing synchronous, cooperative rotation of said rollers in opposite directions.

Another object of the present invention is to provide a process for tenderizing meat, comprising the steps of:

providing a tenderizing apparatus comprising a pair of interfaced rollers each having a plurality of pyramidal points arranged in a grid;

rotating the rollers in opposite directions while maintaining a fixed, constant distance therebetween;

cooling and maintaining at least the rollers of the tenderizing apparatus at a temperature of about 40°-60° F.;

cooling the meat to be tenderized to a temperature of 10°-25° F.; and passing the meat maintained at 10°-25° F. through said rollers in the direction of rotation of said rollers, whereby said meat is tenderized after one pass through said rollers.

Still yet another object of the present invention is to provide a process for tenderizing surf clam tongues, comprising the steps of:

providing a tenderizing apparatus comprising:
(a) a pair of opposed longitudinal, rotatable rollers having parallel axes of rotation, said axes being fixed to maintain a spacing between said rollers, said spacing being minimum within a plane extending through said axes of rotation;
(b) each roller comprising a plurality of pyramidal points each extending radially outwardly a distance "h" from the entire outer surface of the roller, said pyramidal points being arranged in a grid defined by a plurality of adjacent substantially annular rows and a plurality of adjacent substantially axial rows;
(c) said rollers being axially and rotationally offset such that during rotation, at least within said plane extending through said axes of rotation, (i) each annular row of pyramidal points on one roller extends between two adjacent annular rows of pyramidal points on the other, opposed roller, (ii) each axial row of pyramidal points on said one roller extends between two adjacent axial rows of pyramidal points on said other, opposed roller, and (iii) when measured within said plane extending through said axes of rotation, vertexes of pyramidal points arranged in one axial row on said one roller are spaced about "⅜ h" from a lowermost point of a valley formed between two adjacent axial rows on said other, opposed roller;

rotating the rollers in opposite directions;
cooling and maintaining at least the rollers of the tenderizing apparatus at a temperature of about 40°-60° F.;

cooling a surf clam tongue to a temperature of 10°–25° F.; and passing the surf clam tongue maintained at 10°–25° F. through said rollers in the direction of rotation of said rollers, whereby said surf clam tongue is tenderized after one pass through said rollers.

DETAILED DESCRIPTION OF THE DRAWINGS

Figure 1:
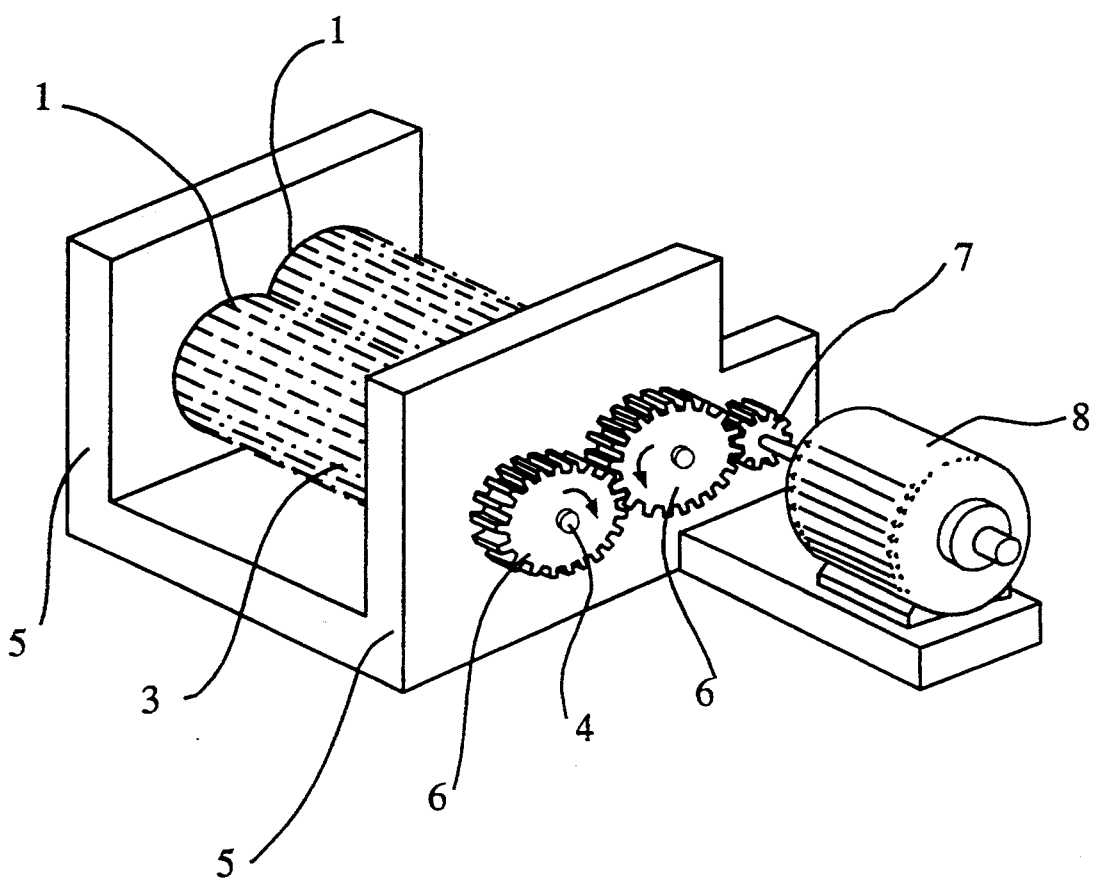
FIG. 1 is a perspective view of the tenderizing apparatus of the present invention.

FIG. 1 shows one embodiment of the meat tenderizing apparatus of the present invention. The apparatus includes a pair of opposed longitudinal, rotatable rollers 1 having parallel axes of rotation. Each roller includes a main roller body 3 and an axle 4. The axle 4 is provided at a radially innermost portion of the main roller body 3 and extends beyond each axial end thereof.

The axle of each roller is fixed in stationery side plates 5 so as to allow free rotation of the rollers while maintaining a fixed distance between the axes of rotation of the rollers, and thus a fixed distance between the rollers. It is necessary for the axes of the rollers to be fixed in order to fix the spacing between the rollers and thus provide high compressive or crushing forces on the meat passing through the rollers. Gears 6 are fixed to the end of each roller and are interactive to maintain a predetermined interfacing relationship between the rollers. The gears 6 are meshed with a gear 7 of a motor 8 for providing the driving force which rotates the rollers. As shown by the arrows on the gears 6 in FIG. 1, the rollers rotate in opposite directions to provide a forward feeding action from above the rollers. It is preferred that both rollers are positively driven via the gears 6 and 7.

Figure 2:
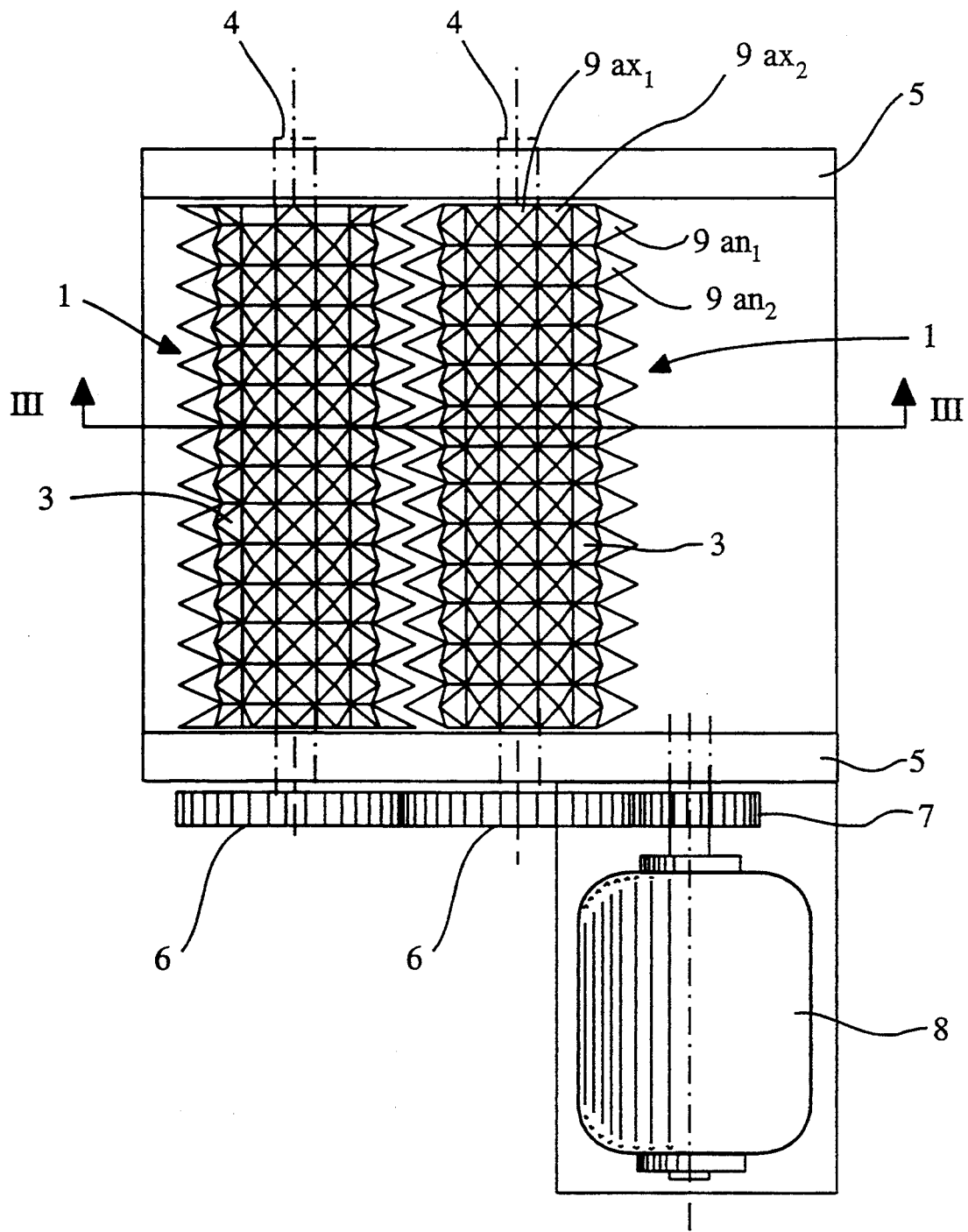
FIG. 2 is a top elevational view of the apparatus of FIG. 1.

FIG. 2 is a top view of the tenderizing apparatus of FIG. 1 which shows more detail with respect to the rollers and the interfacing between the rollers. Although the rollers never actually contact each other, they do interface at a region contained in the plane extending through their respective axes of rotation to provide a tenderizing effect when meat is passed therethrough.

Figure 3:
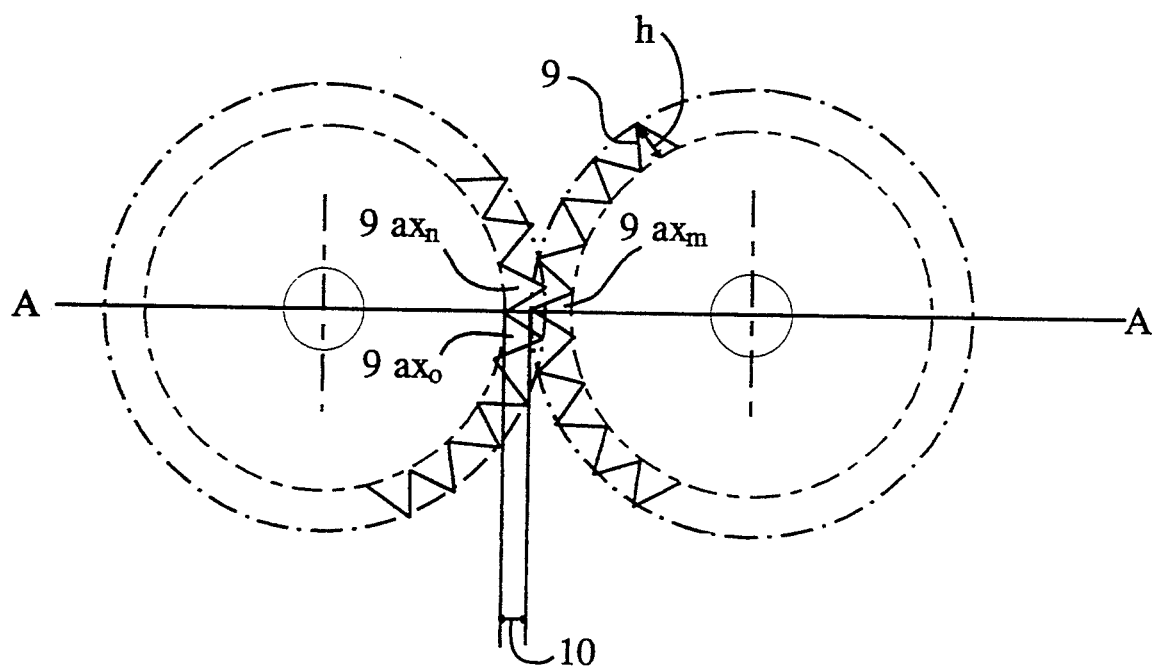
FIG. 3 is a cross-sectional view taken through line III—III of FIG. 2.

FIG. 3 is a cross sectional view of the rollers taken along the line III—III of FIG. 2. FIGS. 2 and 3 show that each roller includes a plurality of pyramidal points 9 each extending radially outwardly a distance "h" from the entire outer surface of the roller. The pyramidal points are arranged in a grid defined by a plurality of adjacent substantially annular rows ($9an_1$, $9an_2$, . . . etc.) of points and a plurality of adjacent substantially axial rows ($9ax_1$, $9ax_2$, . . . etc.) of points.

The rollers are axially and rotationally offset such that during rotation, at least within the plane extending through the axes of rotation of the roller (A—A in FIG. 3), each annular row $9an$ of pyramidal points on one roller extends between two adjacent annular rows of pyramidal points on the other, opposed roller (FIG. 2). Further, each axial row $9ax$ of pyramidal points on one roller extends between two adjacent axial rows of pyramidal points on the other, opposed roller (FIG. 3).

Also, when measured within the plane extending through the axes of rotation of the rollers (A—A), vertexes of pyramidal points arranged in one axial row on one roller are spaced about "⅜ h" from a lowermost point of a valley formed between two adjacent axial rows of pyramidal points on the other, opposed roller. The lowermost point of the valley is, in effect, the outer surface of the roller which carries the pyramidal points. Reference numeral 10 in FIG. 3 shows the ⅜ h spacing between the vertexes of pyramidal points arranged in axial row $9ax_m$ on one roller and the lowermost point of the valley formed between the two adjacent axial rows $9ax_n$ and $9ax_o$ on the other, opposed roller. Although somewhat redundant, it is also noted that, when viewed perpendicular to the plane extending through the axes of rotation of the rollers, that is, the top view of FIG. 2, vertexes of pyramidal points arranged in one annular row on one roller are spaced the same ⅜ h distance from the lowermost point of the valley formed between two adjacent annular rows on the other, opposed roller.

Figure 4:
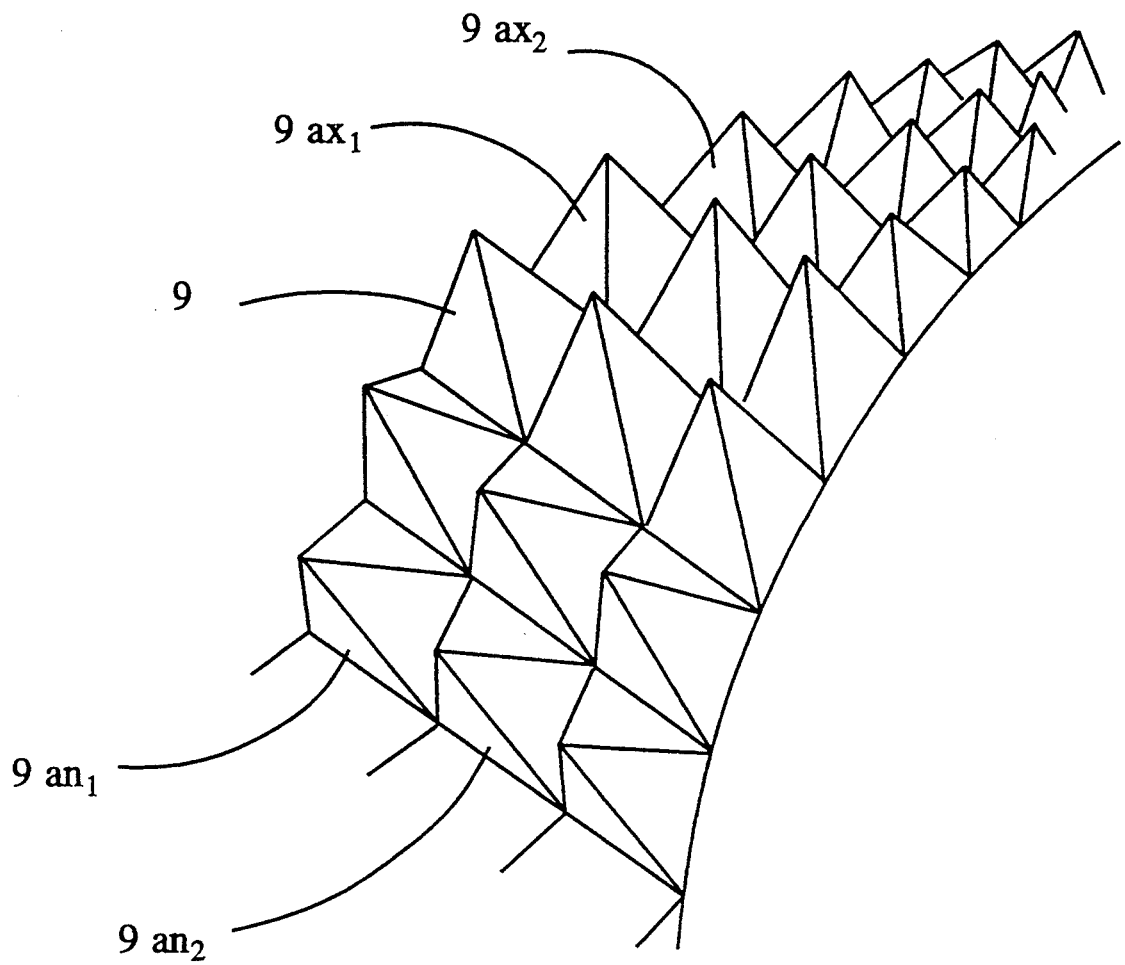
FIG. 4 is an exploded partial perspective view of the rollers used in the apparatus of FIG. 1.

FIG. 4 is a close-up sectionalized view of the outer surface of one of the two opposed rollers. As shown in FIG. 4 (and in FIG. 2) the annular and axial rows of pyramidal points extend perpendicular to each other to define a grid. Preferably, the pyramidal points on the two rollers are identical in shape, size and configuration, although the rollers are arranged in the apparatus offset axially and rotationally as shown in FIGS. 2 and 3, respectively. FIGS. 2 and 4 show that each of the pyramidal points has a square base and the base of each pyramidal point contacts bases of pyramidal points in each row adjacent thereto (i.e., there is no spacing between pyramidal points). Preferably, the sides of the pyramid points are about 60° relative to the outer surface of the roller. However, it is possible to use pyramids of varying shapes, sizes and degrees, although any change in one roller should be accompanied by a corresponding change in the other roller (i.e., the rollers preferably are identical).

The height of the pyramidal points depends upon the meat to be tenderized. For example, surf clam tongues average ¼" to ⅜" in thickness and it has been found that pyramidal points about ¼" in height work well. As a general rule, the height (h) of the pyramidal points should be about equal to the thickness of the meat to be tenderized. The important point is the ⅜ h spacing discussed above.

The rollers can be made of any suitable material. For example, the rollers can be made of plastic (e.g., "HERCULITE" ®) metal, wood, ceramic or composite materials thereof. Preferably, the rollers are made of stainless steel to avoid rusting.

Figure 5:
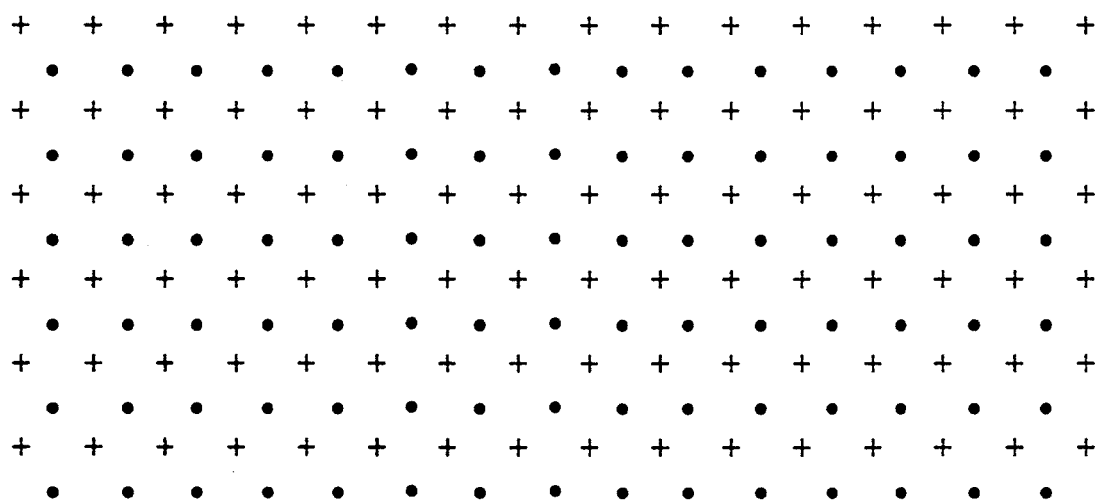
FIG. 5 is an exemplary view of the interfacing between the rollers of the apparatus of FIG. 1.

FIG. 5 shows the waffled effect imposed on the meat passed through the tenderizing apparatus of the present invention. In FIG. 5, "+" designates the point of contact of pyramidal points on one roller and "●" designates the points of contact of the pyramidal points on the other, opposed roller. The waffled effect is created when the meat is passed through the interfacing region between the two rollers, that is, proximate the plane extending between the rotational axes of the rollers. As shown in FIG. 5, each pyramidal point on one roller extends into a valley defined between 4 adjacent pyramidal points on the other, opposed roller.

By using rollers having fixed axes of rotation, a fixed distance is maintained between the rollers (i.e., ⅜ h). Thus, when meat is passed through the rollers, a constant compressive force is applied thereto. This compressive force is set up in a plurality of zones of compression defined between the interfacing pyramidal points on the opposed rollers. The zones of compression are made available by the specific configuration of the points (i.e., pyramidal), the fixed spacing between the rollers, and the manner in which the rollers are axially (FIG. 2) and rotationally (FIG. 3) offset, as described earlier. The zones of compression effectively trap and compress the meat and facilitate maximum tenderization.

Figure 6:
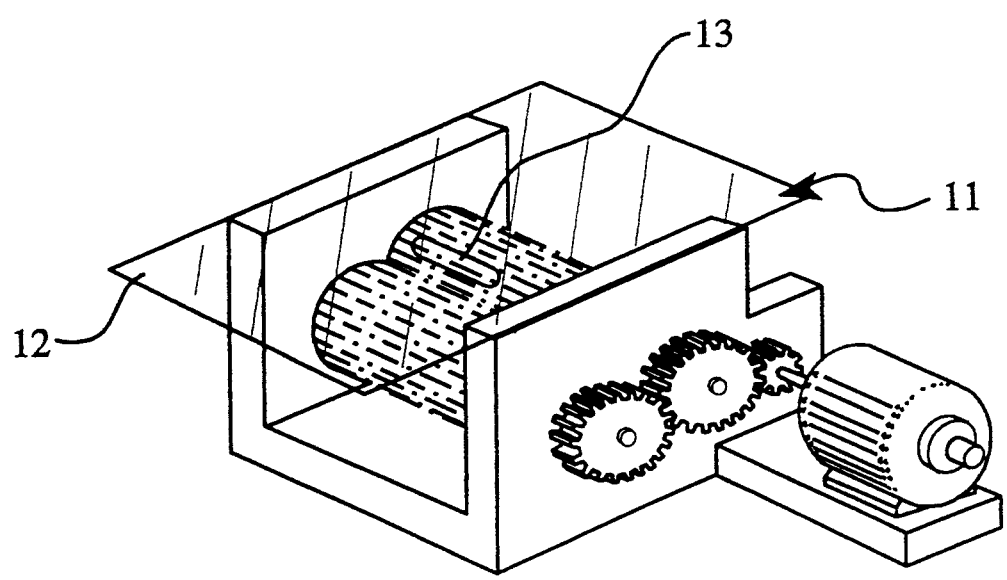
FIG. 6 is a perspective view of the apparatus of FIG. 1 with certain modifications.

FIG. 6 shows the tenderizing apparatus of FIG. 1 with added safety features. Meat entry means 11 is provided for introducing meat between the rotating opposed rollers, while providing a certain degree of protection for the worker. The meat entry means comprises a guard plate 12 which substantially covers the rollers and slot means 13 for introducing meat between the rotating opposed rollers. The meat is discharged from the bottom of the apparatus after passing through the rotating rollers.

The process of the present invention is believed effective for tenderizing all types of otherwise tough and chewy meats (e.g., surf clam tongues, squid, etc. . . . ). The process is particularly suitable for tenderizing surf clam tongues. Accordingly, the process of the present invention will be described in connection with surf clam tongues.

The process of the present invention employs use of the tenderizing apparatus described above, particularly, the fixed interfaced rollers having a plurality of pyramidal points arranged in a grid and spaced from each other in the interfacing region between the rollers as described above. The rollers are rotated preferably at a speed of 10–30 rpm during the tenderizing operation. It is desirable that at least the rollers of the tenderizing apparatus are cooled and maintained at a temperature of about 40°–60° F. For this purpose, it conceivable that the entire tenderizing apparatus can be contained in a closed environment, the temperature of which is maintained at 40°–60° F. If the roller temperature is below 40° F., the clam tongues tend to be broken when passed through the rollers whereas above 60° F. the clam tongues tend to stick to the rollers.

Next, surf clam tongues to be tenderized are cooled to a temperature of 10°–25° F. The thus cooled surf clam tongues are then individually passed through the rotating rollers in the direction of rotation of the rollers while the rollers are maintained at 40°–60° F. The surf clam tongue is thus tenderized after only a single pass through the rotating rollers. Many prior art devices and apparatuses require several passes before tenderizing is achieved. The present invention achieves tenderization after only one pass through the rollers, and is thus particularly suited for assembly line-type applications.

The inventors believe that the pretenderizing step of cooling the surf clam tongues to 10°–25° F. partially freezes the muscle fibers in the meat. In this partially frozen state, the fibers become rigid, and thus less elastic. When the surf clam tongue is then passed through the rollers of the tenderizing apparatus of the present invention, the interfacing between opposed pyramidal points on the rollers effectively crushes the partially frozen muscle fibers, thus tenderizing the clam tongue as a whole. The interaction between pyramidal points on the opposed rollers provides a plurality of zones of compression from which the clam tongue cannot escape. Thus, the pyramidal points do not cut or tear the clam tongue, but rather, compress and crush the partially frozen muscle fibers, and thus tenderize the entire clam tongue. The outer texture of the resultant tenderized clam tongue resembles that of a waffle and contains pyramidal point impressions on opposite surfaces thereof in the same general manner as shown in FIG. 5.

The pressure applied to the clam tongue by the rotating rollers causes approximately a 30% increase in length. The tenderized clam tongue, however, is uniform in thickness and is capable of maintaining its shape after being thawed to room temperature.

It is a common practice in the seafood industry to classify surf clam tongues by number per pound. Similar practices are used for classifying shrimp and other seafood. The following table shows the preferred temperature to which the clam tongue should be cooled depending upon the size thereof.

TABLE 1

| Size of Clam Tonque | Cooling Temperature |
| --- | --- |
| 10–12/# | ~23° F. |
| 12–14/# | ~23° F. |
| 14–16/# | ~21° F. |
| 16 and over/# | ~21° F. |

As it is possible to process clam tongues which fall below and above the ranges indicated in Table 1, it is preferred that the clam tongues are cooled to a temperature between 10°–25° F., more preferably between 15°–23° F. If the clam tongues are cooled to below 10° F., the process renders them over-tenderized such that they do not maintain their shape after being thawed to room temperature. It is important that the tenderized clam tongue can maintain its shape at room temperature for facilitating further processing for the consumer (e.g., pan-frying). Further, clam tongues cooled below 10° F. are also harder than those cooled to 10°–25° F., and as such cause more wear and tear on the machinery and require more time and energy to prepare, without any noticeable added benefit in tenderness. If the clam tongue is cooled to a temperature above 25° F., the meat is not sufficiently tenderized and thus exhibits characteristics similar to untreated meat.

EXAMPLE

The following Example shows the tenderizing effects of the apparatus and process of the present invention.

Several clam tongues were laid flat on trays and cooled to temperatures of 10°, 15°, 20° and 25° F. These cooled clam tongues were then tenderized using the tenderizing apparatus of the present invention as specifically detailed below.

The tenderizing apparatus was the same as that generally shown in FIG. 1. The rollers were prepared from "HERCULITE" ®, which is a hard plastic material used in the food industry and which machines easily. The initial diameter of the rollers was 2⅝". A grid of square pyramidal points was machined into the roller using conventional machining techniques. Each pyramid had a dimension at its base of ¼ inch on a side, and the sides of the pyramid were inclined 60° relative to the base. Thus, the height (h) of each pyramid was (sin 60)×⅛" or 0.216". The rollers were axially and rotationally offset as shown in the present drawings and interfaced such that the pyramidal points on one roller are spaced a distance ⅔ h from the lowermost valley of points on the other roller as explained above in detail. The rollers were rotated towards each other at a speed of 20 r.p.m. and the entire tenderizing operation was carried out in a room having a temperature of 60° F.

The cooled claim tongues were each passed once through the rotating rollers to achieve tenderization.

To evaluate the extent of tenderization achieved by the present apparatus and process, each of the above thus tenderized clam tongues was frozen to −20° C., and central portions of each clam tongue were punctured with a 22 mm diameter stainless steel die to provide circular test pieces. It was necessary to freeze the clam tongues to −20° C. to facilitate cutting of the test pieces with the die.

The weight of each test piece was measured and thawed to room temperature (25° C.) in a plastic bag to prevent water loss before testing. Over 20 sample pieces were prepared from each group of clam tongues frozen at the temperatures of 10°, 15°, 20° and 25° F. As a comparison, over 20 test pieces also were prepared from untreated clam tongues. That is, clam tongues without any tenderizing according to the invention were also frozen to −20° C. and cut into test samples as in the case of the clam tongues tenderized according to the invention.

While the tenderized clam tongues were prepared by the inventors, the process of preparing samples and testing those samples, as explained below, was performed by the CAFT/Food Manufacturing Technology Facility at Rutgers University. A summary of the testing procedures is outlined below.

Texture Profile Analysis (TPA) is a well known technique for testing properties of food. Specifically, TPA is a test that compresses a bite-size piece of food to 25% of its original height (i.e., 75% compression), two times with a probe in a reciprocating motion that imitates the action of the jaw. This test provides a force-time curve from which a number of textural parameters that correlate well with sensory evaluations of those parameters can be derived. The instrument used for the TPA test of the surf clams herein was a TA.XT2 Texture Analyzer, built by Stable Micro Systems, Texture Technologies Corp., Scarsdale, N.Y. The instrument setup is shown in Table 2.

TABLE 2

| | |
|---|---|
| Probe Type | TA-25 2" dia cylinder |
| Test Type | Texture Profile Analysis |
| Measure Type | Measure Force in Compression |
| Distance | 75.0% of product height. |
| Speed | 5.0 mm/s |
| Time | 3.0 s |
| Trigger Type | Auto Trigger |
| Trigger Force | 20.0 grams |

The Texture Analyzer machine provides a resulting force-time curve generated from an XT.RA Dimension Plotter, built by Stable Micro Systems, Surrey, England. Table 3 shows the setup of the XT.RA Plotter.

TABLE 3

| | |
|---|---|
| Graph Type | Force v Time (N) |
| Distance Threshold | 0.5 mm |
| Force Scaling | 12 kg |
| Auto-Scaling | on/off |
| Points per second | 200 |
| Force Units | Grams |

TABLE 3-continued

| | |
|---|---|
| Contact area | 379.94 mm$^2$ |
| Contact force | 20 grams |

A stereomicroscope was used to observe the physical change of the tissue appearance before and after the test treatment. The test results are evaluated in terms of hardness, fracturability, springiness, cohesiveness, adhesiveness, gumminess, chewiness, initial stress and modulus. These parameters are well known in the art of food analysis. For each test sample piece, the TPA graph and its parameters were printed and collected. The overall results are tabulated in Table 4. Analysis of standard deviation and least significant differences were used to ascertain significant effects at the 5% level. Paired 2-tailed student T-test was conducted for each parameter between treatments.

TABLE 4

TPA TEST OF CLAM TONGUES*

| Sample I.D. | Untreated Clam | Treated Clam At | | | |
|---|---|---|---|---|---|
| | | 25° F. | 20° F. | 15° F. | 10° F. |
| Product Height (mm) | 8.06$^a$ | 7.57$^{ab}$ | 7.25$^b$ | 7.77$^b$ | 7.59$^a$ |
| Initial Stress (dyns/cm$^2$) | 31.44$^a$ | 5.11$^b$ | 4.96$^b$ | 5.66$^b$ | 5.04$^b$ |
| Springiness | 0.34$^a$ | 0.30$^b$ | 0.27$^b$ | 0.26$^b$ | 0.29$^b$ |
| Gumminess (Kg) | 4.83$^a$ | 0.84$^b$ | 0.90$^b$ | 0.79$^b$ | 0.79$^b$ |
| Fracturability | n/a@ | n/a | n/a | n/a | n/a |
| Cohesiveness | 0.42$^a$ | 0.33$^b$ | 0.34$^b$ | 0.31$^b$ | 0.33$^b$ |
| Adhesiveness | 0.00$^a$ | −0.02$^b$ | −0.02$^b$ | 0.00$^c$ | −0.00$^b$ |
| Hardness (Kg) | 11.39$^a$ | 2.53$^b$ | 2.64$^b$ | 2.50$^b$ | 2.41$^b$ |
| Chewiness (Kg) | 1.67$^a$ | 0.26$^b$ | 0.25$^b$ | 0.21$^b$ | 0.23$^b$ |
| Modulus (10$^4$ dyns/cm$^2$) | 41.92$^a$ | 6.81$^b$ | 6.47$^b$ | 7.55$^b$ | 6.72$^b$ |

*All tests are undertaken with the same instrument set-up and at room temperature (25° C.)
$^{a-c}$(n-20): Means in rows with same superscripts not significantly different (P < 0.05).
@"n/a": not available.

It can be seen from the results of the TPA test that the clam tongue samples tenderized according to the present invention showed a 4 to 5 fold decrease in hardness as compared to the untreated surf clams. The initial stress, gumminess, chewiness and modulus of the tenderized clam tongues was also significantly reduced compared to that of the untreated clam tongue samples.

Accordingly, the apparatus and process of the present invention provide a means by which the seafood industry can use surf clam tongues for applications other than clam chowder. In fact, surf clam tongues of the present invention can be served as a whole steak and cut with a fork. Thus, the present apparatus and process provide a significant contribution to the art of tenderizing means, particularly surf clam tongues.

While the present invention has been described above by way of reference to the drawings and examples, certain modifications of the invention could be made without departing from the scope of the appended claims. For example, the present invention could be easily adapted to all types of meat, with little or no effort in modifying the apparatus and process described above.

We claim:

1. A meat tenderizing apparatus, comprising:
   a pair of opposed longitudinal, rotatable rollers having parallel axes of rotation, said axes being fixed to maintain a spacing between said rollers, said spacing being minimum within a plane extending through said axes of rotation;

each roller comprising a plurality of pyramidal points each extending radially outwardly a distance h from the entire outer surface of the roller, said pyramidal points being arranged in a grid defined by a plurality of adjacent substantially annular rows and a plurality of adjacent substantially axial rows;

said rollers being axially rotationally offset such that at all times during rotation, at least within said plane extending through said axes of rotation, (i) each annular row of pyramidal points on one roller extends between two adjacent annular rows of pyramidal points on the other, opposed roller, and (ii) each axial row of pyramidal points on said one roller extends between two adjacent axial rows of pyramidal points on said other, opposed roller means for maintaining spacing of about ⅔ h between said rollers to thereby enhance the tenderizing effect of said apparatus, said spacing being measured, within said plane extending through said axes of rotation, from vertexes of pyramidal points arranged in one axial row on said one roller to a lowermost point of a valley formed between two adjacent axial rows on said other, opposed roller; and means for providing synchronous, cooperative rotation of said rollers in opposite directions.

2. The apparatus of claim 1, wherein said vertexes are spaced exactly ⅔ h from said valley.

3. The apparatus of claim 1, wherein said annular and axial rows of pyramidal points extend perpendicular to each other.

4. The apparatus of claim 1, wherein said means for providing synchronous, cooperative rotation of said rollers comprises means for positively driving both rollers.

5. The apparatus of claim 4, wherein said means for positively driving both rollers comprises interactive gear means provided at an end portion of each roller and a motor for driving said gear means.

6. The apparatus of claim 1, wherein each roller comprises a main roller body and an axle provided at a radially inner most portion thereof and extending beyond each axial end of said main roller body.

7. The apparatus of claim 6, further comprising side plate means for holding respective ends of said axle and maintaining a fixed spacing between said rollers.

8. The apparatus of claim 7, further comprising meat entry means for introducing meat between the rotating opposed rollers.

9. The apparatus of claim 8, wherein said meat entry means comprises a guard plate substantially covering said rollers and slot means for introducing meat between the rotating opposed rollers.

10. The apparatus of claim 1, wherein the rollers are identical.

11. The apparatus of claim 1, wherein each pyramidal point has a square base.

12. The apparatus of claim 11, wherein the base of each pyramidal point contacts bases of pyramidal points in each row adjacent thereto.

13. The apparatus of claim 1, wherein the pyramidal points are uniform in shape and size.

14. The apparatus of claim 1, wherein sides of the pyramidal points are about 60° relative to the outer surface of the roller.

15. The apparatus of claim 1, wherein in the region of said plane extending through said axes of rotation, each pyramidal point on said one roller extends into a valley defined between four pyramidal points on said other, opposed roller.

16. The apparatus of claim 1, wherein the rollers are made a material selected from the group consisting of plastic, metal, wood, ceramic, and composite materials thereof.

17. The apparatus of claim 16, wherein the rollers are made of stainless steel.

18. The apparatus of claim 1, wherein h is about ¼ inch.

19. A process for tenderizing meat, comprising the steps of:

providing a tenderizing apparatus comprising a pair of interfaced rollers each having a plurality of pyramidal points arranged in a grid;

rotating the rollers in opposite directions while maintaining a fixed, constant distance therebetween;

cooling and maintaining at least the rollers of the tenderizing apparatus at a temperature of about 40°–60° F.;

cooling the meat to be tenderized to a temperature of 10°–25° F.; and passing the meat maintained at 10°–25° F. through said rollers in the direction of rotation of said rollers, whereby said meat is tenderized after one pass through said rollers.

20. The process of claim 19, wherein said meat is a surf clam tongue.

21. A surf clam tongue produced according to the process of claim 20.

22. An article of meat produced according to the process of claim 19.

23. A process for tenderizing surf clam tongues, comprising the steps of:

providing a tenderizing apparatus comprising:

(a) a pair of opposed longitudinal, rotatable rollers having parallel axes of rotation, said axes being fixed to maintain a spacing between said rollers, said spacing being minimum within a plane extending through said axes of rotation;

(b) each roller comprising a plurality of pyramidal points each extending radially outwardly a distance h from the entire outer surface of the roller, said pyramidal points being arranged in a grid defined by a plurality of adjacent substantially annular rows and a plurality of adjacent substantially axial rows;

(c) said rollers being axially and rotationally offset such that during rotation, at least within said plane extending through said axes of rotation, (i) each annular row of pyramidal points on one roller extends between two adjacent annular rows of pyramidal points on the other, opposed roller, (ii) each axial row of pyramidal points on said one roller extends between two adjacent axial rows of pyramidal points on said other, opposed roller, and (iii) when measured within said plane extending through said axes of rotation, vertexes of pyramidal points arranged in one axial row on said one roller are spaced about ⅔ h from a valley formed between two adjacent axial rows on said other, opposed roller; and rotating the rollers in opposite directions;

cooling a surf clam tongue to a temperature of 10°–25° F.; and passing the surf clam tongue cooled to 10°-25° F. through said rollers in the direction of rotation of said rollers, whereby said surf clam tongue is tenderized after one pass through said rollers.

24. The process of claim 23, wherein at least the rollers of the tenderizing apparatus are cooled and maintained at a temperature of about 40°-60° F.

25. The process of claim 23, wherein the size of the surf clam tongue is 10-14/# and the tongue is cooled to a temperature of about 23° F.

26. The process of claim 23, wherein the size of the surf clam tongue is 14-16/# and the tongue is cooled to a temperature of about 21° F.

27. The process of claim 23, wherein the rollers are rotated at 15-20 rpm.

28. A surf clam tongue produced according to the process of claim 23.

29. A process for tenderizing meat, comprising the steps of:
 providing a tenderizing apparatus comprising:
 (a) a pair of opposed longitudinal, rotatable rollers having parallel axes of rotation, said axes being fixed to maintain a spacing between said rollers, said spacing being minimum within a plane extending through said axes of rotation;
 (b) each roller comprising a plurality of pyramidal points each extending radially outwardly a distance h from the entire outer surface of the roller, said pyramidal points being arranged in a grid defined by a plurality of adjacent substantially annular rows and a plurality of adjacent substantially axial rows;
 (c) said rollers being axially and rotationally offset such that during rotation, at least within said plane extending through said axes of rotation, (i) each annular row of pyramidal points on one roller extends between two adjacent annular rows of pyramidal points on the other, opposed roller, (ii) each axial row of pyramidal points on said one roller extends between two adjacent axial rows of pyramidal points on said other, opposed roller, and (iii) when measured within said plane extending through said axes of rotation, vertexes of pyramidal points arranged in one axial row on said one roller are spaced about $\frac{3}{8}$ h from a valley formed between two adjacent axial rows on said other, opposed roller; and
 rotating the rollers in opposite directions;
 cooling an article of meat to a temperature of 10°-25° F.; and
 passing the article of meat cooled to 10°-25° F. through said rollers in the direction of rotation of said rollers, whereby said article of meat is tenderized after one pass through said rollers.

30. An article of meat produced according to the process of claim 29.

* * * * *